(12) United States Patent
Rai et al.

(10) Patent No.: US 7,375,745 B2
(45) Date of Patent: May 20, 2008

(54) METHOD FOR DIGITAL IMAGE STITCHING AND APPARATUS FOR PERFORMING THE SAME

(75) Inventors: Barinder Singh Rai, Surrey (CA); Eric Jeffrey, Richmond (CA); Brett Anthony Cheng, Vancouver (CA)

(73) Assignee: Seiko Epson Corporation, Tokyo (JP)

( * ) Notice: Subject to any disclaimer, the term of this patent is extended or adjusted under 35 U.S.C. 154(b) by 678 days.

(21) Appl. No.: 10/934,956

(22) Filed: Sep. 3, 2004

(65) Prior Publication Data

US 2006/0050152 A1  Mar. 9, 2006

(51) Int. Cl.
 *H04N 5/225* (2006.01)
(52) U.S. Cl. .................. 348/218.1; 382/284
(58) Field of Classification Search ............ 348/239, 348/207.99, 218.1, 47; 358/224; 382/199, 382/284
See application file for complete search history.

(56) References Cited

U.S. PATENT DOCUMENTS

| 3,956,758 A * | 5/1976 | Numata et al. ............ 396/290 |
| 5,138,460 A * | 8/1992 | Egawa ...................... 348/239 |
| 5,173,946 A * | 12/1992 | Rao ........................... 382/199 |
| 5,682,197 A | 10/1997 | Moghadam et al. |
| 5,982,951 A * | 11/1999 | Katayama et al. .......... 382/284 |
| 6,011,558 A * | 1/2000 | Hsieh et al. ................ 345/629 |
| 6,392,658 B1 * | 5/2002 | Oura .......................... 345/629 |
| 6,456,323 B1 | 9/2002 | Mancuso et al. |
| 6,486,908 B1 | 11/2002 | Chen et al. |
| 6,618,511 B1 | 9/2003 | Mancuso et al. |
| 6,657,667 B1 * | 12/2003 | Anderson ............... 348/333.12 |
| 6,677,981 B1 | 1/2004 | Mancuso et al. |
| 6,867,801 B1 * | 3/2005 | Akasawa et al. ......... 348/222.1 |
| 6,885,392 B1 * | 4/2005 | Mancuso et al. ............ 348/36 |
| 7,024,054 B2 * | 4/2006 | Cahill et al. ................ 382/294 |
| 2001/0026684 A1 | 10/2001 | Sorek et al. |
| 2003/0026469 A1 | 2/2003 | Kreang-Arekul et al. |
| 2003/0142882 A1 | 7/2003 | Beged-Dov et al. |
| 2004/0201755 A1 * | 10/2004 | Norskog ...................... 348/239 |

FOREIGN PATENT DOCUMENTS

| JP | 03226075 | 10/1991 |
| JP | 09093430 | 4/1997 |
| JP | 11196311 | 7/1999 |
| JP | 11298837 | 10/1999 |

\* cited by examiner

*Primary Examiner*—David Ometz
*Assistant Examiner*—Gary C. Vieaux
(74) *Attorney, Agent, or Firm*—Mark P. Watson

(57) ABSTRACT

A digital imaging device is operated to capture a first image in a digital format. At least two non-contiguous portions of the first image are rendered in a display of the digital imaging device. The at least two non-contiguous portions of the first image are used to align a live version of a second image in the display, wherein the second image is an extension of the first image. The second image is captured in a digital format. A corner matching algorithm is applied to determine an offset of the second image with respect to the first image, wherein the offset is required to achieve a substantially accurate alignment of the first and second images. Application of the corner matching algorithm is limited to an overlap region intervening between the at least two non-contiguous portions of the first image.

28 Claims, 13 Drawing Sheets

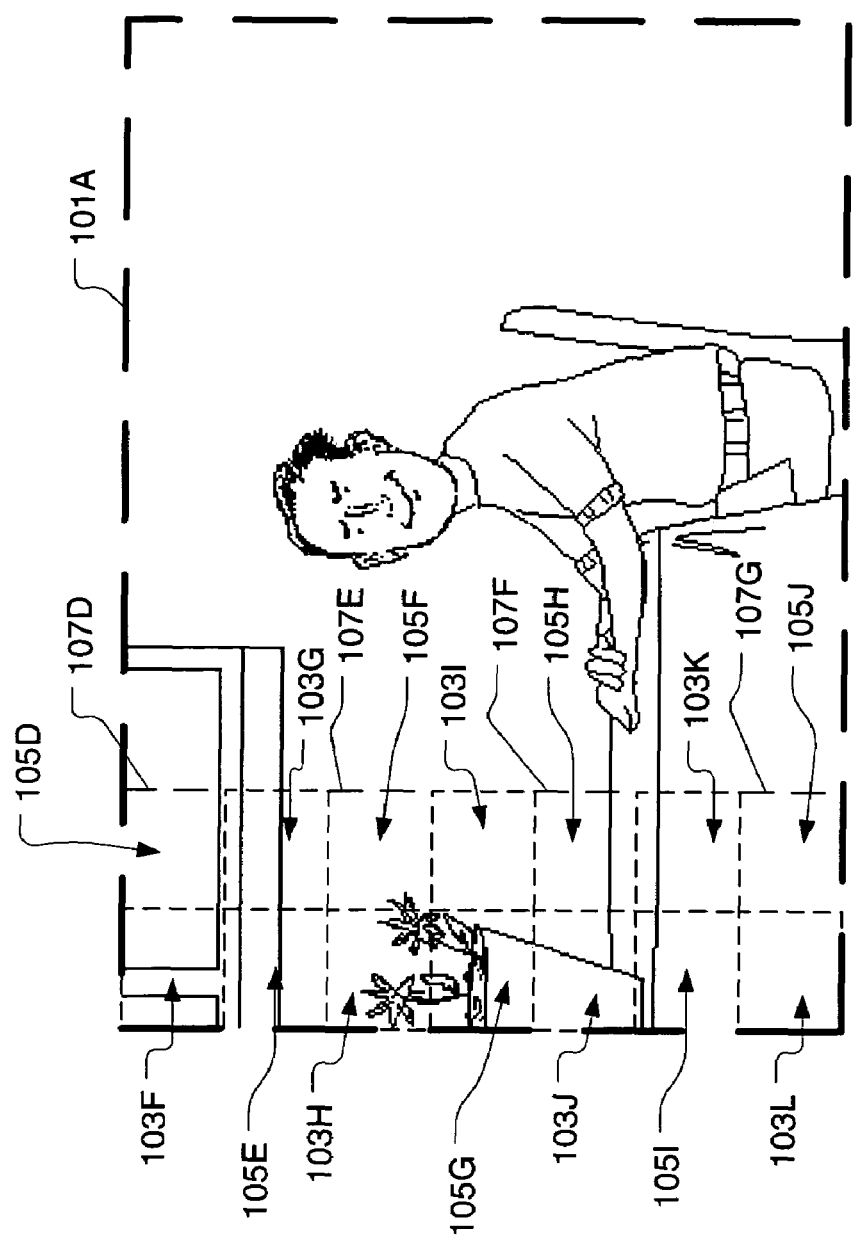

METHOD FOR DIGITAL IMAGE STITCHING AND APPARATUS FOR PERFORMING THE SAME

BACKGROUND OF THE INVENTION

1. Field of the Invention

The present invention relates generally to capture and display of digital image data.

2. Description of the Related Art

In a digital camera, light from a scene passes through a lens which functions to focus and direct the light onto photosensitive cells, i.e., photosites, of a semiconductor chip called an image sensor. The photosites react to incident light to create electrical signals proportional to the incident light. The electrical signals produced by the photosites are processed through an analog-to-digital converter (ADC). The ADC analyzes electrical signals received from the image sensor and converts the electrical signals to digital data which is stored by the camera as the scene image.

The horizontal and vertical extent of a scene that can be captured in a single digital image is limited by the amount of light that a lens can capture and focus onto the image sensor. Therefore, due to lens limitations, a situation often occurs in which an entirety of a scene cannot be captured in a single image. One way of handling this situation is to obtain a wide angle lens that is capable of capturing the entirety of the scene in a panoramic image. However, obtaining the wide angle lens requires additional cost. Also, the wide angle lens can be clumsy to carry, particularly when the digital camera is small or embedded within a handheld electronic device. Furthermore, some digital cameras, such as those embedded within cell phones, may not be configured to accommodate the wide angle lens.

In view of the foregoing, an apparatus is needed to allow for generation of a panoramic digital image without reliance on a wide angle lens.

SUMMARY OF THE INVENTION

In one embodiment, a method for stitching digital images together onboard a digital imaging device is disclosed. The method includes capturing a first image in a digital format. The method also includes displaying at least two non-contiguous portions of the first image in a display of the digital imaging device. Using the at least two non-contiguous portions of the first image, the method proceeds with alignment of a live version of a second image in the display, wherein the second image is an extension of the first image. Then, an operation is performed to capture the second image in a digital format. The method further includes applying a corner matching algorithm to determine an offset of the second image with respect to the first image, wherein the offset is required to achieve a substantially accurate alignment of the first and second images. Application of the corner matching algorithm is limited to an overlap region intervening between the at least two non-contiguous portions of the first image.

In another embodiment, a method for aligning digital images to be stitched together is disclosed. The method includes displaying at least two non-contiguous portions of a first image in a display of a digital imaging device. The method also includes identifying corner features of the first image present within an overlap region intervening between the at least two non-contiguous portions of the first image. Also, corner features of a live version of a second image are identified within the overlap region. The live version of the second image is visible in the display in conjunction with the at least two non-contiguous portions of the first image. The second image represents an extension of the first image. The method further includes identifying alignment of corner features of the first and second images within the overlap region. Additionally, the method includes an operation for indicating identified alignment of corner features of the first and second images within the overlap region.

In another embodiment, a digital imaging device is disclosed. The digital imaging device includes an image capture device, a display panel, and a graphics controller. The image capture device is configured to capture a first image and a second image in an electronic format. The first image and the second image have an amount of overlap. The display panel is configured to display the first image and the second image to be captured by the camera. The graphics controller includes image alignment circuitry, corner detection circuitry, corner matching circuitry, and image stitching circuitry. The image alignment circuitry is defined to retain a display of at least two non-contiguous portions of the first image in the display panel to facilitate alignment of the second image. The corner detection circuitry is defined to identify corner features of the first image present within an overlap region intervening between the at least two non-contiguous portions of the first image. The corner detection circuitry is further defined to identify corner features of the second image that are present within the overlap region. The corner matching circuitry is defined to identify alignment of corner features of the first and second images within the overlap region. The image stitching circuitry is defined to use the identified alignment of corner features of the first and second images within the overlap region to translate the captured second image relative to the captured first image and digitally combine the translated second image with the first image.

In another embodiment, a graphics controller is disclosed. The graphics controller includes image alignment circuitry defined to display portions of a first image in a display panel during alignment of a second image in the display panel. The graphics controller also includes corner detection circuitry defined to identify corner features of the first and second images within a region intervening between the portions of the first image to be displayed in the display panel. Corner matching circuitry of the graphics controller is defined to recognize alignment of identified corner features of the first and second images. The graphics controller further includes image stitching circuitry defined to use the recognized alignment of identified corner features of the first and second images to translate the second image relative to the first image and digitally combine the translated second image with the first image.

Other aspects of the invention will become more apparent from the following detailed description, taken in conjunction with the accompanying drawings, illustrating by way of example the present invention.

BRIEF DESCRIPTION OF THE DRAWINGS

The invention, together with further advantages thereof, may best be understood by reference to the following description taken in conjunction with the accompanying drawings in which:

FIG. 6B is an illustration showing the viewfinder displaying a portion of the scene to be captured as the second image following alignment with the exemplary alignment template of FIG. 6A;

DETAILED DESCRIPTION

Figure 1:
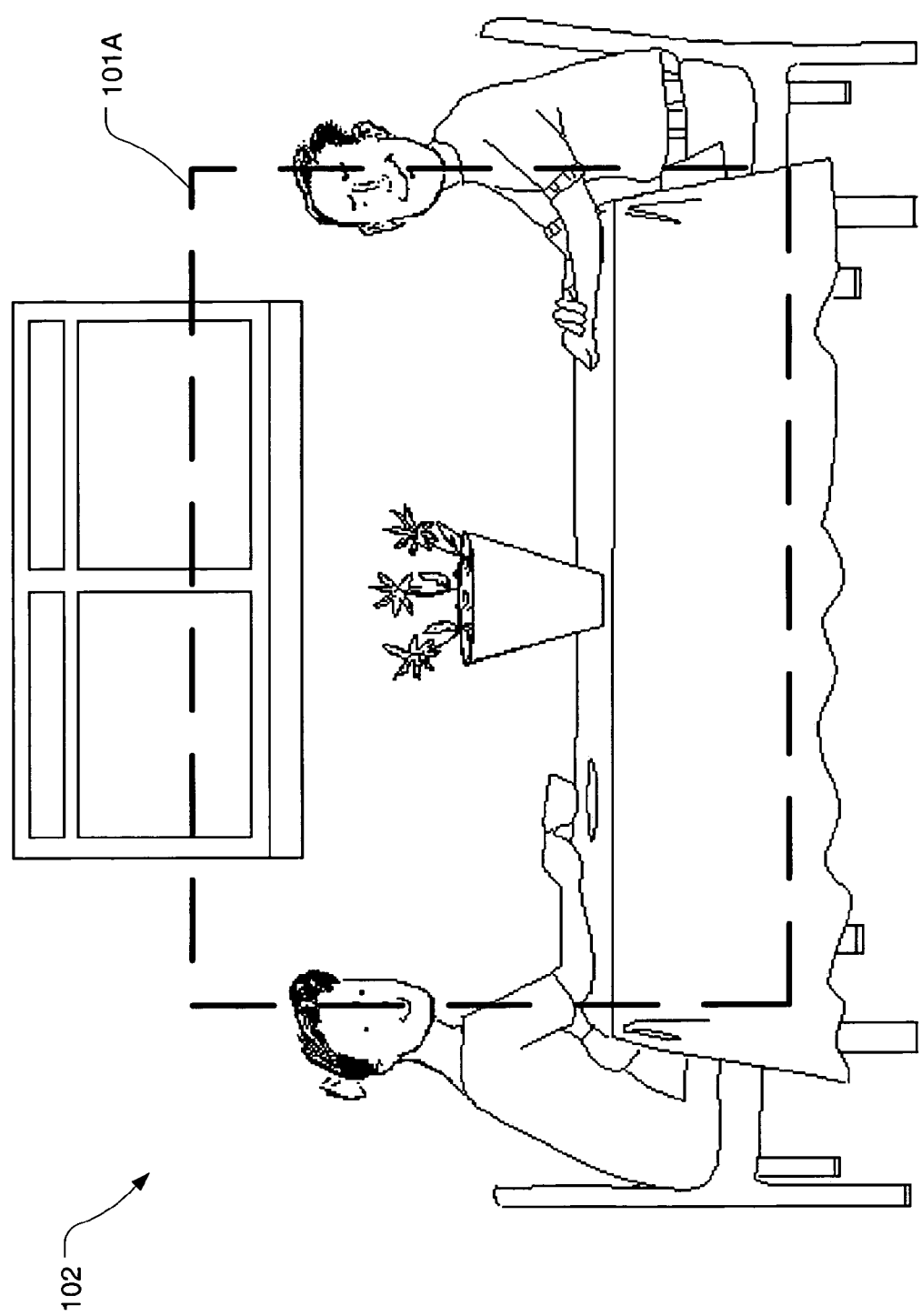
FIG. 1 is an illustration showing an example of a scene to be captured by a digital imaging device, in accordance with an exemplary embodiment of the present invention.

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

Stitching is a term used to describe joining of several digital images to produce a composite digital image. The composite digital image obtained from stitching is similar to a panoramic image taken using a wide angle lens. Using stitching to create the composite digital image avoids additional cost and inconvenience associated with wide angle lenses. Also, digital image stitching allows handheld digital imaging devices, such as cell phones, to have panoramic imaging capability despite being incompatible with wide angle lenses.

In digital photography, a digital image is created by mapping a captured image onto a grid of picture elements or pixels. Each pixel is assigned a tonal value, i.e., pixel value, that most closely corresponds to a portion of the image that the pixel is intended to represent. Tonal values used to define the image can also be used to evaluate properties of the image, such as contrast variations. Contrast variations can be used to identify features, i.e., shapes, depicted in the image. Identification of common features depicted in multiple images can be used to align the multiple images for stitching.

For example, consider a plurality of separate overlapping images. Since each image has some overlap with at least one other image, the plurality of images can be combined to create a panoramic image. One method of combining the plurality of images requires creation of a corner registry for each image. The corner registry for a given image includes identification of each corner feature ("corner") present in the given image. A corner is identified by a large intensity, i.e., contrast, change in the horizontal and vertical directions within a limited pixel area. The limited pixel area can represent an area of variable but limited size, such as a 5×5 array of pixels. It should be appreciated by those skilled in the art that detection of corners in the image can be performed using a corner detection algorithm.

Once all detectable corners have been recorded in the corner registry of each image, the registered corners can be used to determine a proper alignment of the images for combination. For example, each corner in a first image is compared to each corner in a second image to identify potential matches. Each corner in the first image can have several potential matches in the second image. A technique called "score of matching," as known to those skilled in the art, can be used to narrow to one the potential matches from the second image for a given corner in the first image. Once all corners in the first image are processed using the score of matching technique, each corner in the first image will be paired to a single corner in the second image. Then, a required offset necessary to align the first and second images can be determined.

Determination of a required horizontal and vertical offset to align the first and second images is performed using an iterative alignment process. In a given iteration of the alignment process, the second image is translated relative to the first image such that a particular pair of matched corners are aligned. Once the particular pair of matched corners are aligned, the given iteration includes determining a total number of matched corners that are simultaneously aligned. Each subsequent iteration is conducted in the same manner based on alignment of a different pair of matched corners. Based on the iteration results, the second image translation having the largest number of simultaneously aligned matched corners is used to establish the horizontal and vertical offset to align/overlap the first and second images for combination.

The image combination method described above represents an exhaustive approach to combining a plurality of images. More specifically, the image combination method described above identifies and registers all corners in each of the images. Then, the method evaluates all corners in each image for potential matches with all corners in the other images. The method further includes performing the alignment process based on each pair of matched corners existing among the various images. Thus, using this method, the images for a panorama can be out of sequence relative to a direction of pan and still be aligned/overlapped properly. However, the image combination method described above requires a large number of operations, i.e., CPU cycles. Therefore, the method described above requires substantial processing capability, such as that available with a desktop computer or workstation. Due to the substantial processing requirements, the method described above is not suited for implementation on smaller digital imaging devices where processing power is at a premium. For example, most modern digital cameras do not have sufficient processing capability to support efficient onboard implementation of the above-described image combination method.

In contrast to the method described above, the present invention provides an efficient image stitching method for implementation onboard a handheld digital imaging device having limited computational power. The image stitching method of the present invention is concerned with stitching two digital images together to create a final stitched image. In one embodiment, the method assumes that a first image represents a left portion of the final stitched image, and a second image represents a right portion of the final stitched image. For purposes of discussion, the present invention is described in the remainder of this application in terms of the first and second images representing left and right portions, respectively of the final stitched image. However, it should be appreciated that other embodiments of the present invention can assume other spatial relationships between the first and second images, e.g., right/left, top/bottom, bottom/top, diagonal, etc. Once the first image is captured by a digital imaging device, a portion of the first image is retained in a viewfinder of the digital imaging device. The retained portion of the first image is used to assist in manual alignment of the second image. A more accurate manual alignment of the second image serves to reduce an amount of computation required to stitch the first and second images together.

FIG. 1 is an illustration showing an example of a scene 102 to be captured by a digital imaging device, in accordance with an exemplary embodiment of the present invention. The digital imaging device is equipped with a viewfinder 101A capable of displaying a view of the image as it will appear when captured by the digital imaging device. Due to a lens capability of the digital imaging device, and other factors such as available distance from objects within the scene, it may not be possible to capture an entirety of the scene in a single digital image. For example, the digital imaging device may be limited to capturing a portion of the scene. In this example, the portion of the scene 102 capable of being captured by the digital imaging device is visible in the viewfinder 101A. Therefore, to obtain a single image that includes both individuals as depicted in FIG. 1, it is necessary to generate a composite image of the scene 102.

The present invention provides for generation of a composite image, wherein the composite image represents a combination of a pair of images. In one embodiment, a first image of the pair of images represents a left portion of the composite image to be generated. Also in this embodiment, a second image of the pair of images represents a right portion of the composite image to be generated. Additionally, each of the first image and the second image includes a common region representing a common portion of the scene. For example, in the present embodiment, the common region will reside at a right side of the first image and at a left side of the second image. Generally speaking, the present invention provides a two step process for generating the composite image. In a first step, a tool is provided to assist in a manual alignment of the first and second images. In a second step, the first and second images are computationally stitched together.

Figure 2:
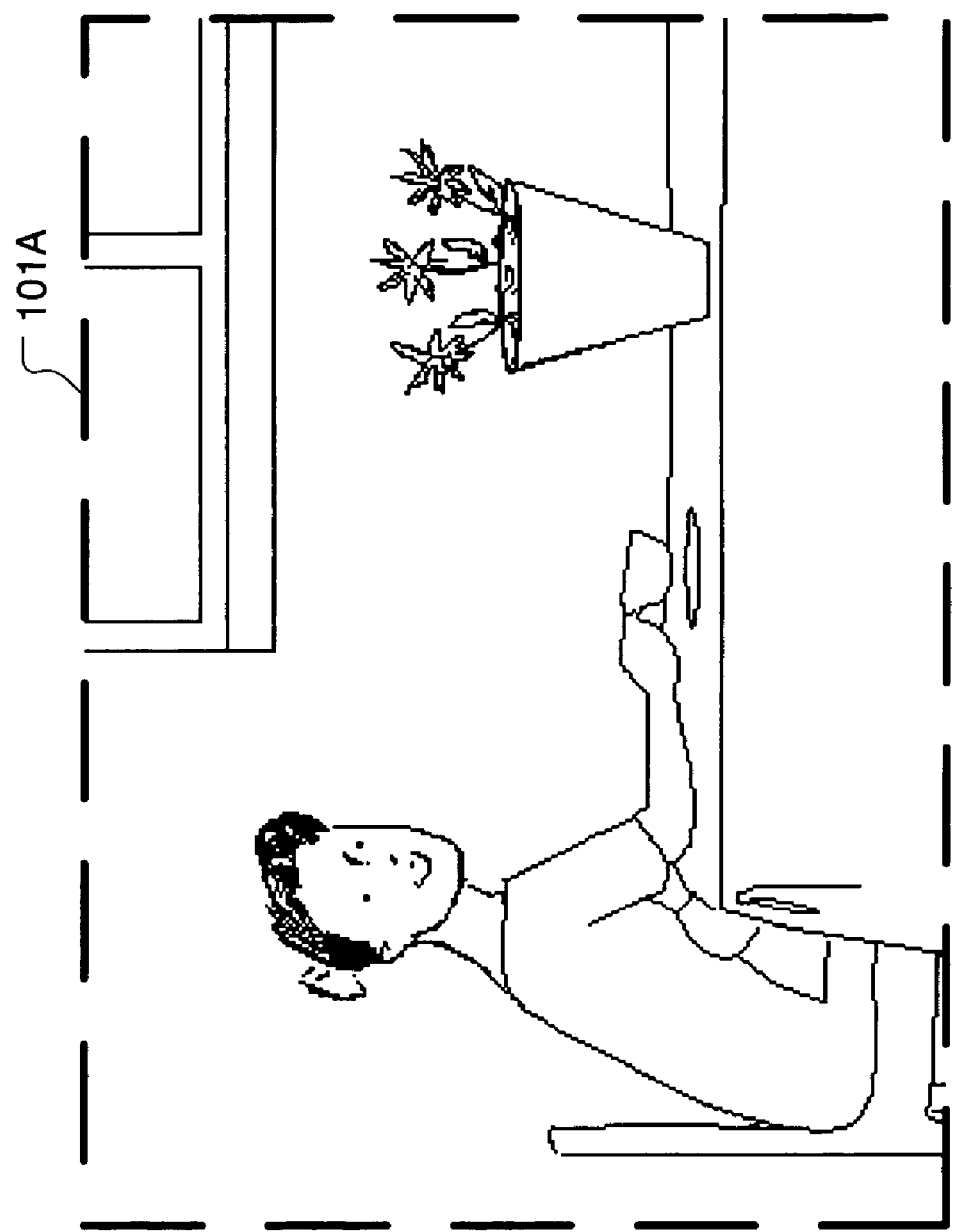
FIG. 2 is an illustration showing the viewfinder positioned over the first image to be captured by the digital imaging device, in accordance with an exemplary embodiment of the present invention.

With respect to the scene 102 depicted in FIG. 1, the method of the present invention first includes capturing the first image in an electronic format. FIG. 2 is an illustration showing the viewfinder 101A positioned over the first image to be captured by the digital imaging device, in accordance with an exemplary embodiment of the present invention. It should be recognized that the first image in the present exemplary embodiment represents a left portion of the composite image to be generated. Once the first image is captured by the digital imaging device, portions of the first image are retained in the viewfinder 101A to assist with manual alignment of the second image. More specifically, the retained portions of the first image represent at least two non-contiguous portions of the first image selected from a region near the right side of the first image. The retained portions of the first image are also representative of portions of the second image that are near the left side of the second image. Therefore, the retained portions of the first image are displayed at a left side of the viewfinder 101A to assist with manual alignment of the second image.

Figure 3A:
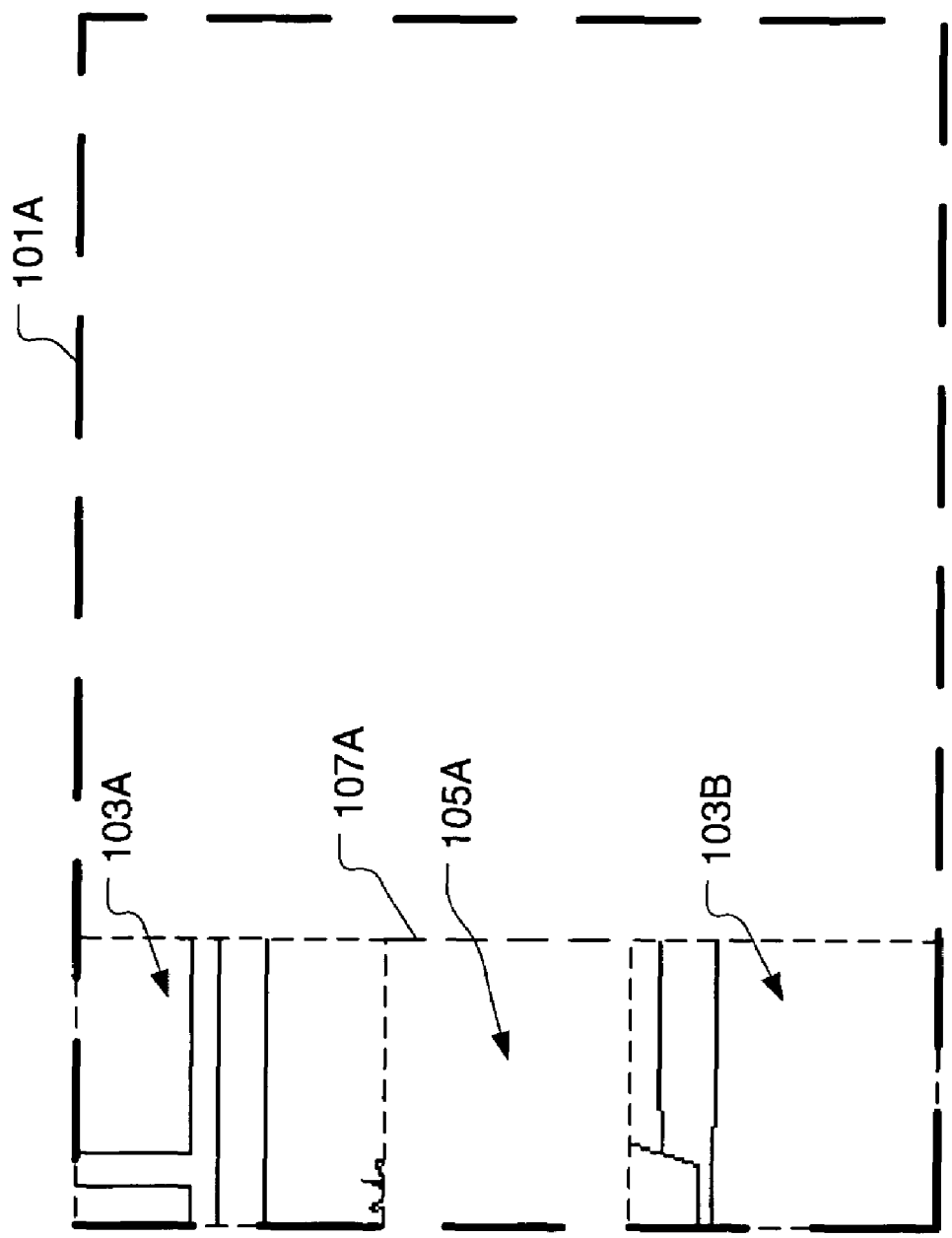
FIG. 3A is an illustration showing the viewfinder displaying retained portions of the first image as shown in FIG. 2, in accordance with one embodiment of the present invention.

FIG. 3A is an illustration showing the viewfinder 101A displaying retained portions 103A/103B of the first image as shown in FIG. 2, in accordance with one embodiment of the present invention. The retained portions 103A/103B of the first image depicted in FIG. 3A correspond to a particular alignment template in which an upper right corner (103A) and a lower right corner (103B) of the first image are retained. It should be appreciated that the retained portions 103A/103B of the first image in FIG. 3A represent non-contiguous portions of the first image. Thus, the viewfinder 101A includes a region 105A intervening between the retained portions 103A/103B of the first image. The region 105A is bounded by the retained portions 103A/103B of the first image and a boundary 107A extending between the retained portions 103A/103B of the first image, wherein the boundary 107A is not visible within the viewfinder 101A.

Figure 3B:
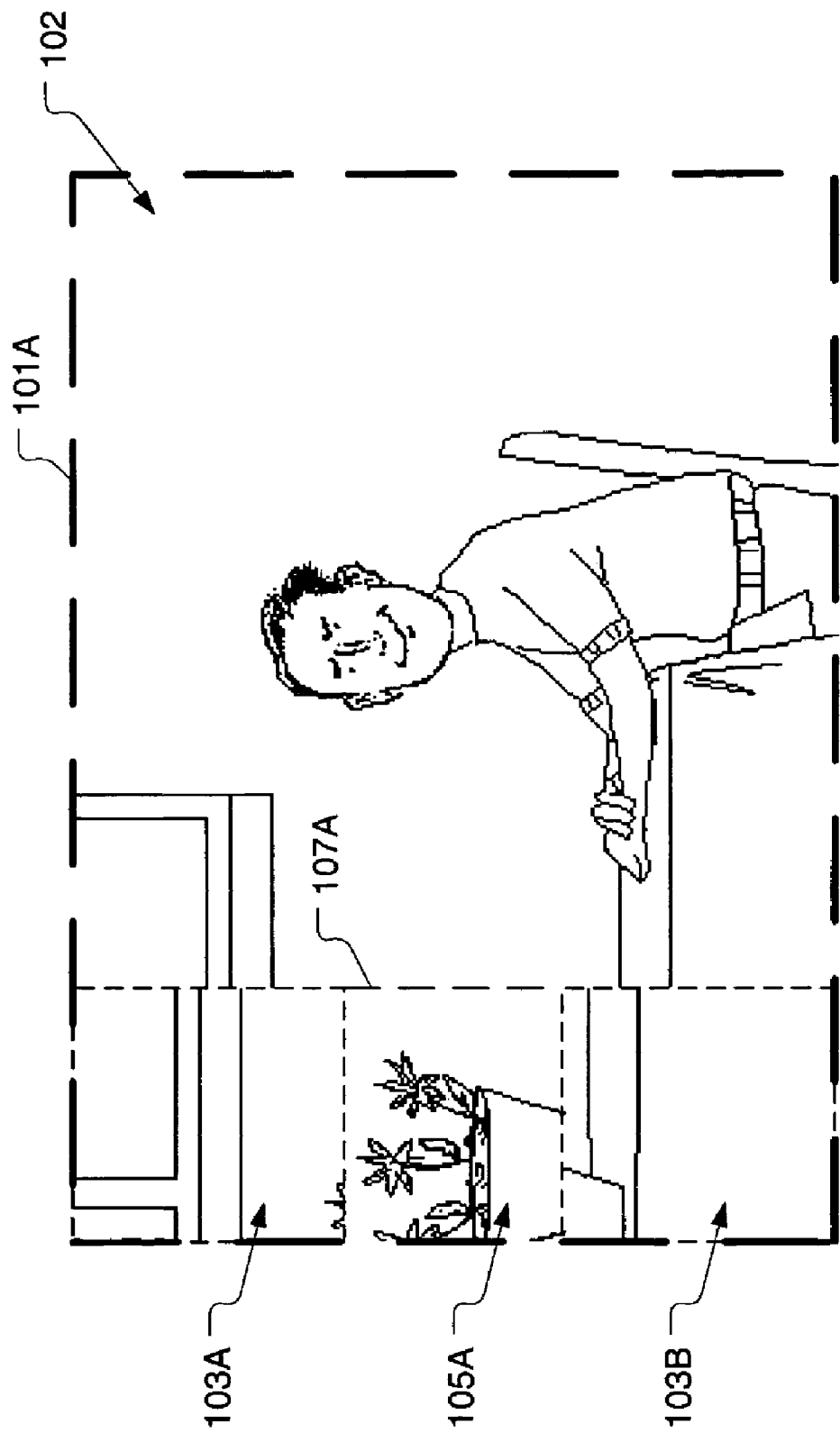
FIG. 3B is an illustration showing the viewfinder displaying a live version of the scene as the viewfinder is manually aligned for capture of the second image, in accordance with one embodiment of the present invention.

FIG. 3B is an illustration showing the viewfinder 101A displaying a live version of the scene 102 as the viewfinder 101A is manually aligned for capture of the second image, in accordance with one embodiment of the present invention. The retained portions 103A/103B of the first image are displayed in the viewfinder 101A in conjunction with the live version of the scene 102. Features depicted in the retained portions 103A/103B of the first image can be used as landmarks to obtain a better manual alignment of the second image with the first image.

With some digital imaging devices, the viewfinder 101A can be quite limited in size. Also, reliance solely on visual observation can cause difficulty in gauging true alignment of the first and second images. Therefore, in addition to providing the alignment template in the viewfinder 101A, various embodiments of the present invention can also include provision of other alignment tools capable of generating user-feedback indicative of how well the first image is aligned with the live version of the scene 102, corresponding the second image to be captured.

For example, in one embodiment as a user of the digital imaging device proceeds with manual alignment of the second image to be captured, an analysis is performed to evaluate an amount of alignment between common portions of the first image and the live version of the scene 102. More specifically, landmark features of the first image residing in the region 105A between the retained portions 103A/103B of the first image are identified. Also, landmark features of the live version of the scene 102 currently displayed in the region 105A of the viewfinder 101A are identified. Then, identified landmark features of the first image and the live version of the scene 102 from within the region 105A are compared to each other to determine whether alignment exists between corresponding landmark features.

Figure 3C:
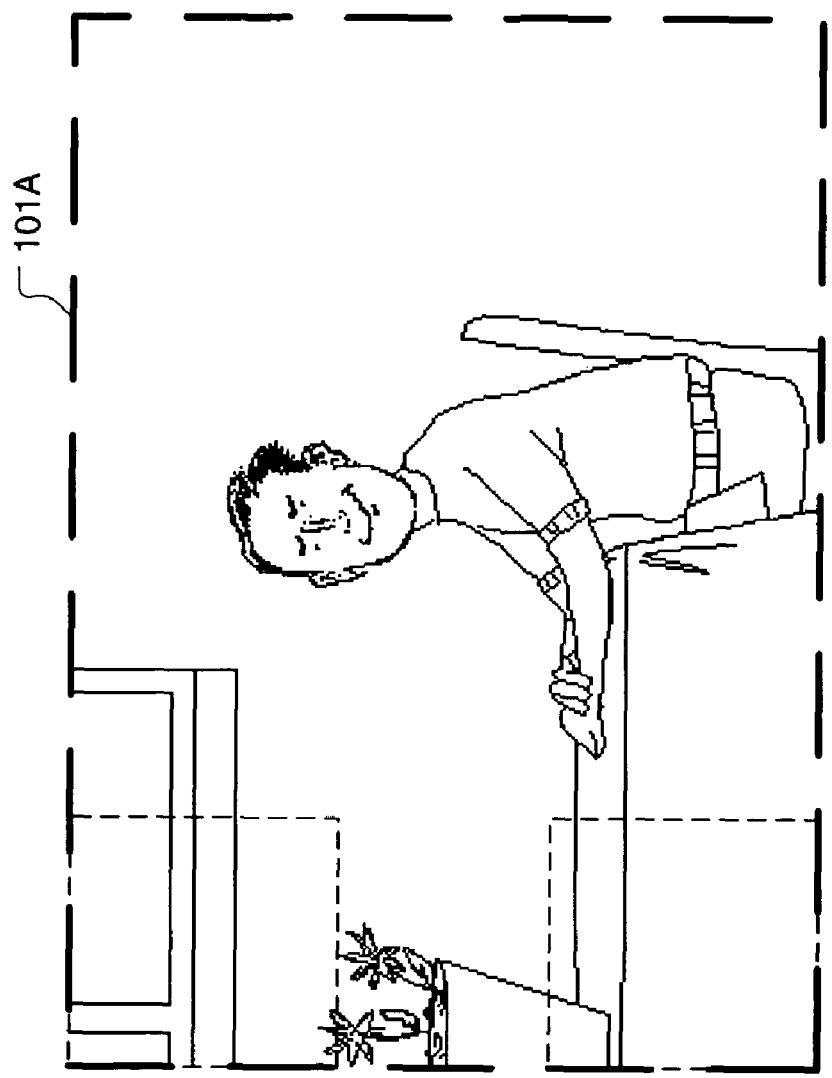
FIG. 3C is an illustration showing the viewfinder displaying a good alignment between first image and the live version of the scene corresponding to the second image to be captured, in accordance with one embodiment of the present invention.

If alignment does exist between corresponding landmark features, pixels of the viewfinder 101A displaying the aligned landmark features can be changed to a special alignment color. It should be appreciated that the special alignment color can be any color easily visible to the user of the digital imaging device e.g., black, white, translucent, etc. As the live version of the scene is better aligned with the first image, more landmark features will be aligned and more of the region 105A will be changed to the special alignment color. The best achievable manual alignment of the first image and the live version of the scene to be captured as the second image will be obtained when the user sees the most of the special alignment color in the region 105A of the viewfinder 101A. Preferably, though not required, the second image will be captured when the best achievable manual alignment is obtained. FIG. 3C is an illustration showing the viewfinder 101A displaying a good alignment between first image and the live version of the scene 102 corresponding to the second image to be captured, in accordance with one embodiment of the present invention.

In an alternate embodiment, an indicator light can be used to signal to a user when sufficient manual alignment of the first image and the live version of the scene to be captured as the second image is obtained. Once signaled by the indicator light, the user can proceed with capture of the second image. It should be appreciated that determining the sufficiency of alignment between the first image and the live version of the scene can be accomplished using the landmark feature alignment analysis as described above. Furthermore, in a variation of this embodiment, the second image can be automatically captured when sufficient manual alignment of the first image and the live version of the scene is obtained. The automatic capture of the second image can be performed in combination with provision of the indicator light signal. Also, the automatic capture feature and/or the indicator light signal can be implemented in conjunction with the special alignment color display as previously discussed. Still further, in another embodiment, a warning light can be illuminated to signal poor alignment between the first image and the live version of the scene corresponding to the second image to be captured. It should be appreciated that other feedback mechanisms based on the landmark feature alignment analysis can also be employed to assist in manual alignment of the first image and second image to be captured.

In one embodiment, the landmark feature alignment analysis as previously discussed is performed using a corner matching algorithm. However, with respect to FIGS. 3A through 3C, it should be appreciated that the corner matching algorithm is only applied to the region 105A intervening between the retained portions 103A/103B of the first image. Thus, the present invention applies the corner matching algorithm within small overlay regions existing between the retained portions 103A/103B of the first image. Hence, the present invention avoids applying the corner matching algorithm over a large portion of the first and second images. Therefore, rather than detecting all corner features in the first and second images, the present invention limits corner feature detection to the region 105A intervening between the retained portions 103A/103B of the first image. Consequently, the corner matching algorithm as implemented in the present invention requires fewer processor operations that other methods which may require the corner matching algorithm to be applied over larger portions of the first and second images. Additionally, an efficiency of the corner matching algorithm as implemented by the present invention is improved by limiting a number of possible corner feature matches to those present within the region 105A intervening between the retained portions 103A/103B of the first image.

Figure 4:
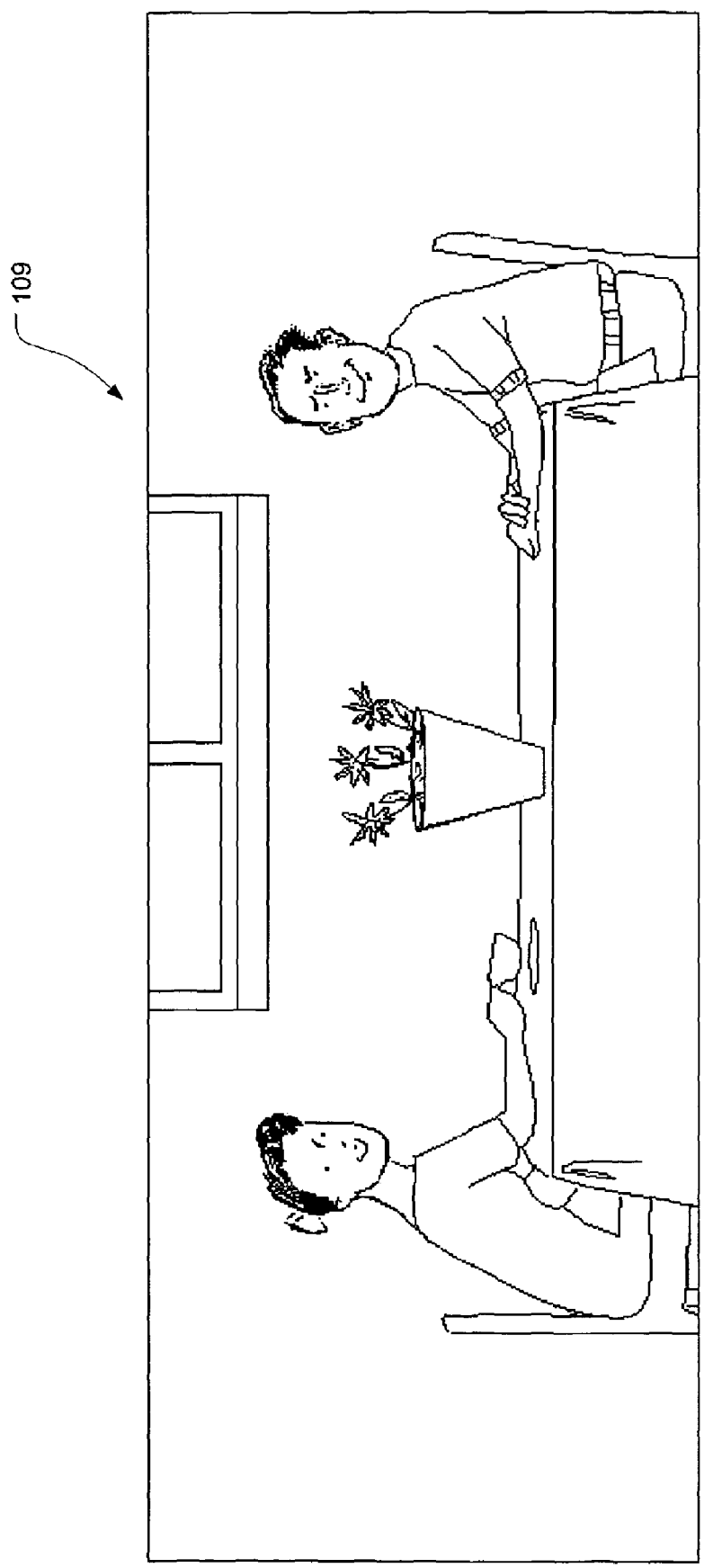
FIG. 4 is an illustration showing a composite image generated by applying the method of the present invention as previously discussed with respect to FIGS. 1 through 3C.

In addition to using the corner matching algorithm to facilitate the landmark feature alignment analysis performed during the manual alignment process, the present invention also uses the corner matching algorithm to determine a translation of the captured second image necessary to obtain a substantially accurate alignment of the first and second images. Here again, the present invention applies the corner matching algorithm within the small overlay region 105A existing between the retained portions 103A/103B of the first image. Thus, the present invention improves the efficiency of the corner matching algorithm by requiring fewer corners to be matched and by providing a better initial alignment of the first and second images upon capture. Once the necessary translation of the second image is determined, the present invention translates the second image accordingly and computationally stitches the first and second images together to generate the composite image. FIG. 4 is an illustration showing a composite image 109 generated by applying the method of the present invention as previously discussed with respect to FIGS. 1 through 3C.

With respect to the method of the present invention as described above, the retained portions of the first image can correspond to a number of different alignment templates. Each alignment template can provide different manual alignment advantages. For example, better manual alignment of the first and second images can be obtained using alignment templates that have more edge interfaces between the retained portions of the first image and the second image, particularly when the edge interfaces lie in different directions. In one embodiment, a user of the digital imaging device can be provided with options for choosing an alignment template that is most suitable for use with a particular scene.

Figure 5A:
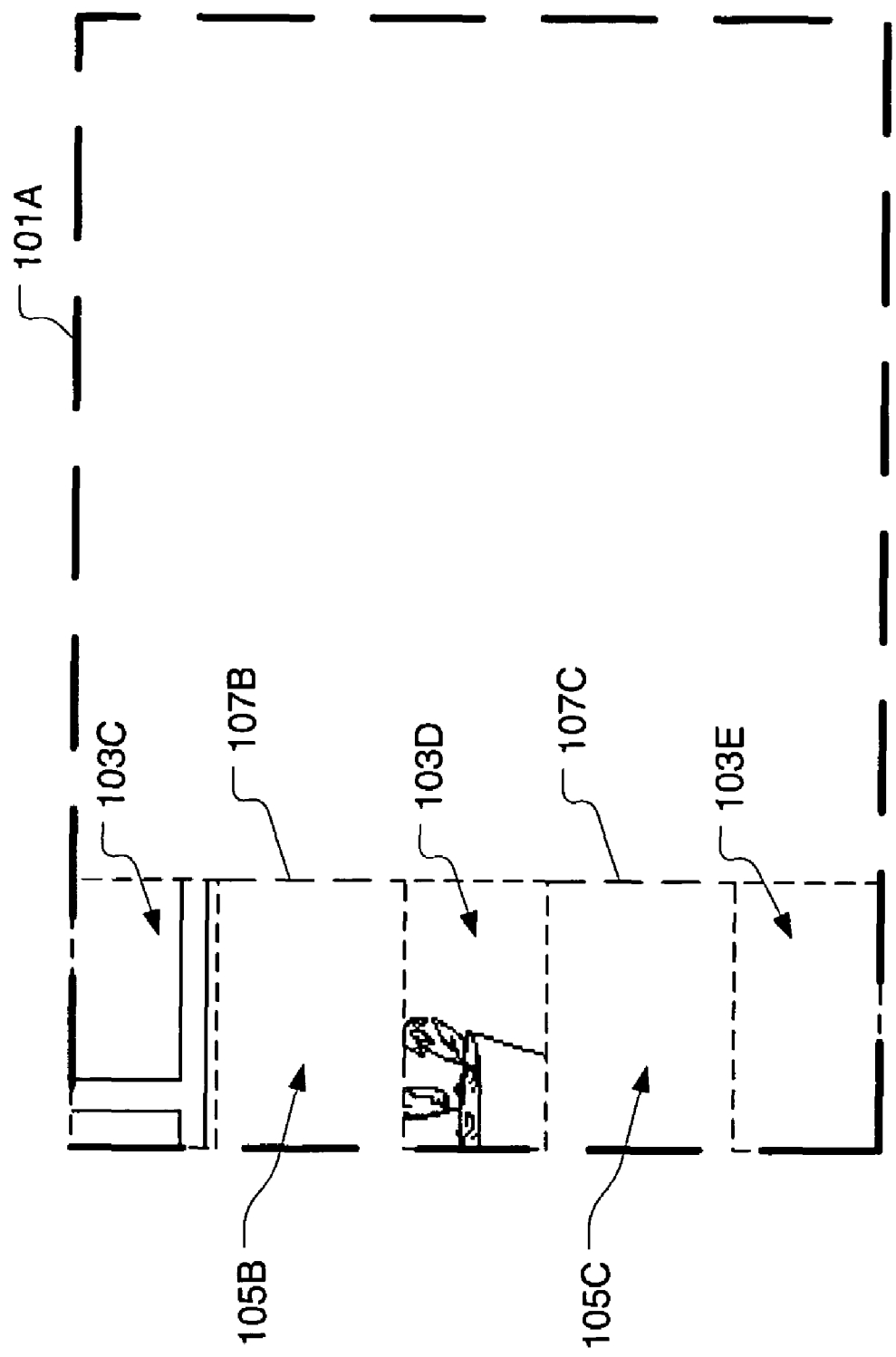
FIG. 5A is an illustration showing the viewfinder displaying an exemplary alignment template corresponding to the first image as shown in FIG. 2, in accordance with one embodiment of the present invention.
Figure 5B:
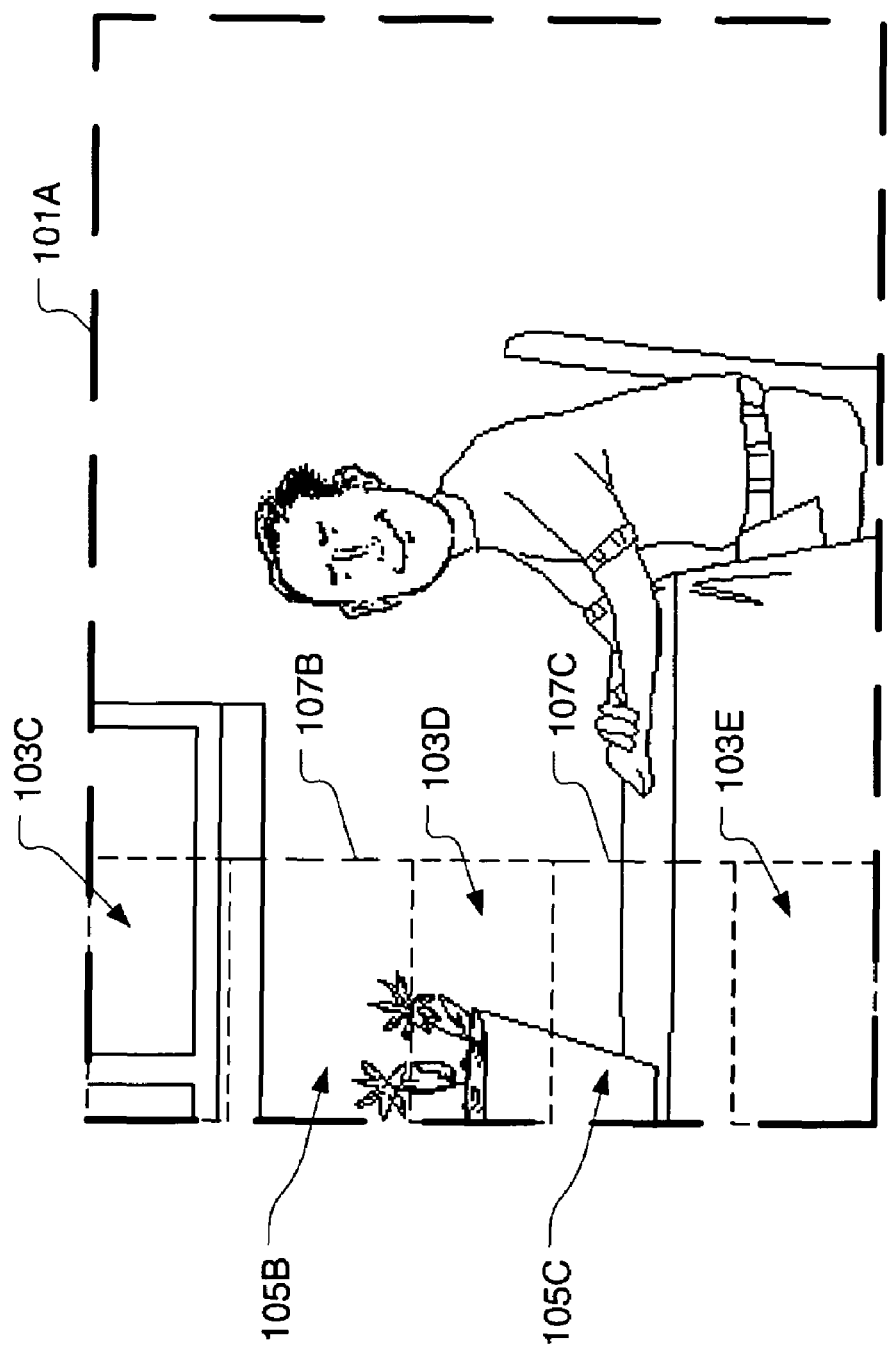
FIG. 5B is an illustration showing the viewfinder displaying a portion of the scene to be captured as the second image following alignment with the exemplary alignment template of FIG. 5A.

FIG. 5A is an illustration showing the viewfinder 101A displaying an exemplary alignment template corresponding to the first image as shown in FIG. 2, in accordance with one embodiment of the present invention. The alignment template in the example of FIG. 5A includes a number of non-contiguous retained portions 103C-103E of the first image. Regions 105B and 105C exist between the retained portions 103C-103E. The region 105B is bounded by the retained portions 103C and 103D of the first image and a boundary 107B extending between the retained portions 103C and 103D. The region 105C is bounded by the retained portions 103D and 103E of the first image and a boundary 107C extending between the retained portions 103D and 103E of the first image. The boundaries 107B and 107C are not visible within the viewfinder 101A. FIG. 5B is an illustration showing the viewfinder 101A displaying a portion of the scene 102 to be captured as the second image following alignment with the exemplary alignment template of FIG. 5A.

Figure 6A:
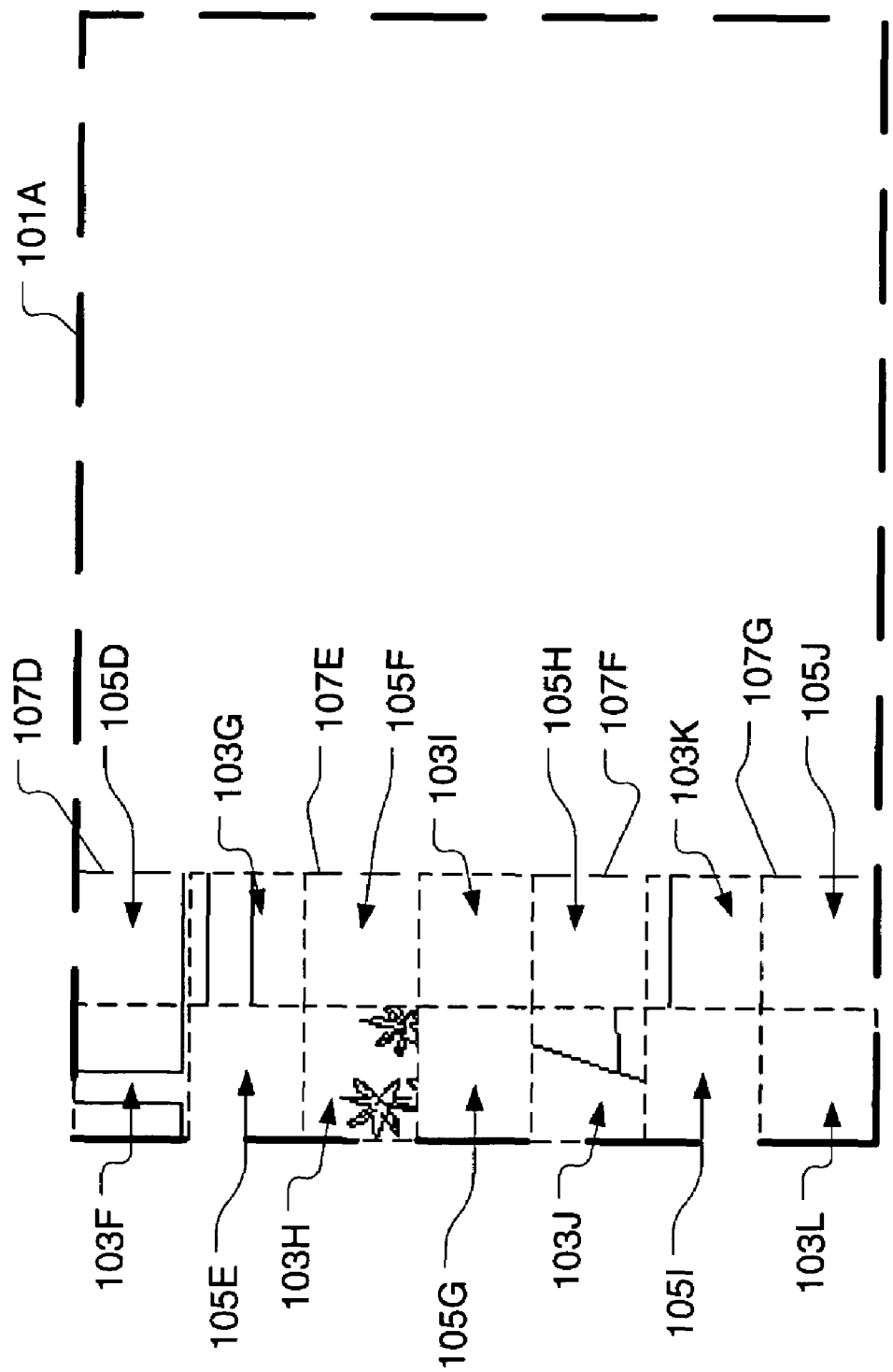
FIG. 6A is an illustration showing the viewfinder displaying another exemplary alignment template corresponding to the first image as shown in FIG. 2, in accordance with one embodiment of the present invention.

FIG. 6A is an illustration showing the viewfinder 101A displaying another exemplary alignment template corresponding to the first image as shown in FIG. 2, in accordance with one embodiment of the present invention. The alignment template in the example of FIG. 6A includes a number of non-contiguous retained portions 103F-103L of the first image. Regions 105D-105J exist between the retained portions 103F-103L. The region 105D is bounded by the retained portions 103F and 103G of the first image and a boundary 107D. The region 105E is bounded by the retained portions 103F, 103G, and 103H of the first image. The region 105F is bounded by the retained portions 103G, 103H, and 103I of the first image and a boundary 107E. The region 105G is bounded by the retained portions 103H, 103I, and 103J of the first image. The region 105H is bounded by the retained portions 103I, 103J, and 103K of the first image and a boundary 107F. The region 105I is bounded by the retained portions 103J, 103K, and 103L of the first image. The region 105J is bounded by the retained portions 103K and 103L of the first image and a boundary 107G. The boundaries 107D-107G are not visible within the viewfinder 101A. FIG. 6B is an illustration showing the viewfinder 101A displaying a portion of the scene 102 to be captured as the second image following alignment with the exemplary alignment template of FIG. 6A.

Though the present invention concerns stitching two images together, it should be appreciated that the present invention can also be used to create a panoramic image by stitching a group of more than two images together, two images at a time. In other words, two images from the group will be stitched together to form a first composite image. Then, the first composite image will be stitched with another image from the group to create a second composite image. Successively created composite images can continue to be stitched with subsequent images in the group until the final composite image that is created represents the entire panoramic image.

Figure 7:
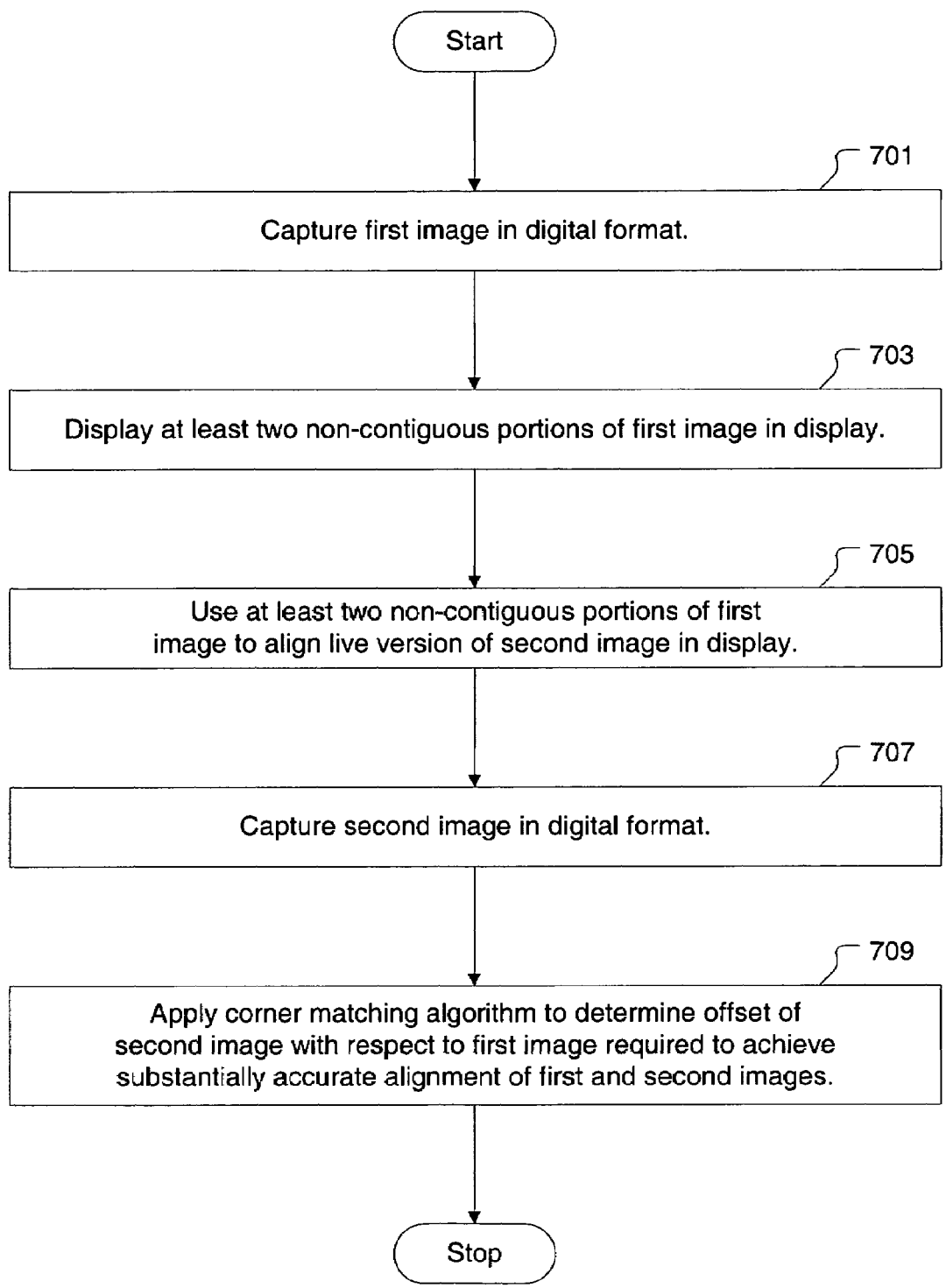
FIG. 7 is an illustration showing a flowchart of a method for stitching digital images together onboard a digital imaging device, in accordance with one embodiment of the present invention.

FIG. 7 is an illustration showing a flowchart of a method for stitching digital images together onboard a digital imaging device, in accordance with one embodiment of the present invention. The method includes an operation 701 for capturing a first image in a digital format. In one embodiment, the first image represents a left portion of a broader image. The method also includes an operation 703 for displaying at least two non-contiguous portions of the first image in a display of the digital imaging device. In one embodiment, the at least two non-contiguous portions of the first image includes an upper right portion of the first image and a lower right portion of the first image. In this embodiment, an overlap region exists between the upper right portion of the first image and the lower right portion of the first image. It should be appreciated, however, that the at least two non-contiguous portions of the first image can represent other portions of the first image in other embodiments.

The method further includes an operation 705 for using the at least two non-contiguous portions of the first image to align a live version of a second image in the display, wherein the second image represents an extension of the first image. In the embodiment where the first image represents the left portion of the broader image, the second image represents a right portion of the broader image. Once the live version of the second image is aligned in the display, the method includes an operation 707 for capturing the second image in a digital format. The method then includes an operation 709 for applying a corner matching algorithm to determine an offset of the second image with respect to the first image, wherein the offset represents a translation required to achieve a substantially accurate alignment of the first and second images. It should be appreciated that application of the corner matching algorithm is limited to an overlap region intervening between the at least two non-contiguous portions of the first image used to align the live version of the second image in the display. Once the offset is determined, the method can include operations for translating the second image relative to the first image by the determined offset. Then, the translated second image can be digitally combined, i.e., stitched, with the first image to generate a composite image.

In one embodiment, the method of FIG. 7 can also include an operation for analyzing an alignment of the first image and the live version of the second image to assist with using the at least two non-contiguous portions of the first image to align the live version of the second image in the display. Analyzing the alignment of the first image and the live version of the second image is limited to the overlap region intervening between the at least two non-contiguous portions of the first image. A sufficient alignment of the first image and the live version of the second image can be indicated by illuminating a signal light. Also, insufficient alignment of the first image and the live version of the second image can be indicated by illuminating a warning light. In one embodiment, when a sufficient alignment of the first image and the live version of the second image is achieved, the second image is automatically captured in the digital format.

The operation for analyzing the alignment of the first image and the live version of the second image can include identifying corner features present in the first image within the overlap region intervening between the at least two non-contiguous portions of the first image. Also, corner features present in the live version of the second image within the overlap region are identified. Then, alignment of common identified corner features present in the first image and the live version of the second image within the overlap region are recognized. Alignment of the common identified corner features of the first image and the live version of the second image, as recognized within the overlap region, can be indicated by changing a color of a number of pixels corresponding to the common identified corner features.

Figure 8:
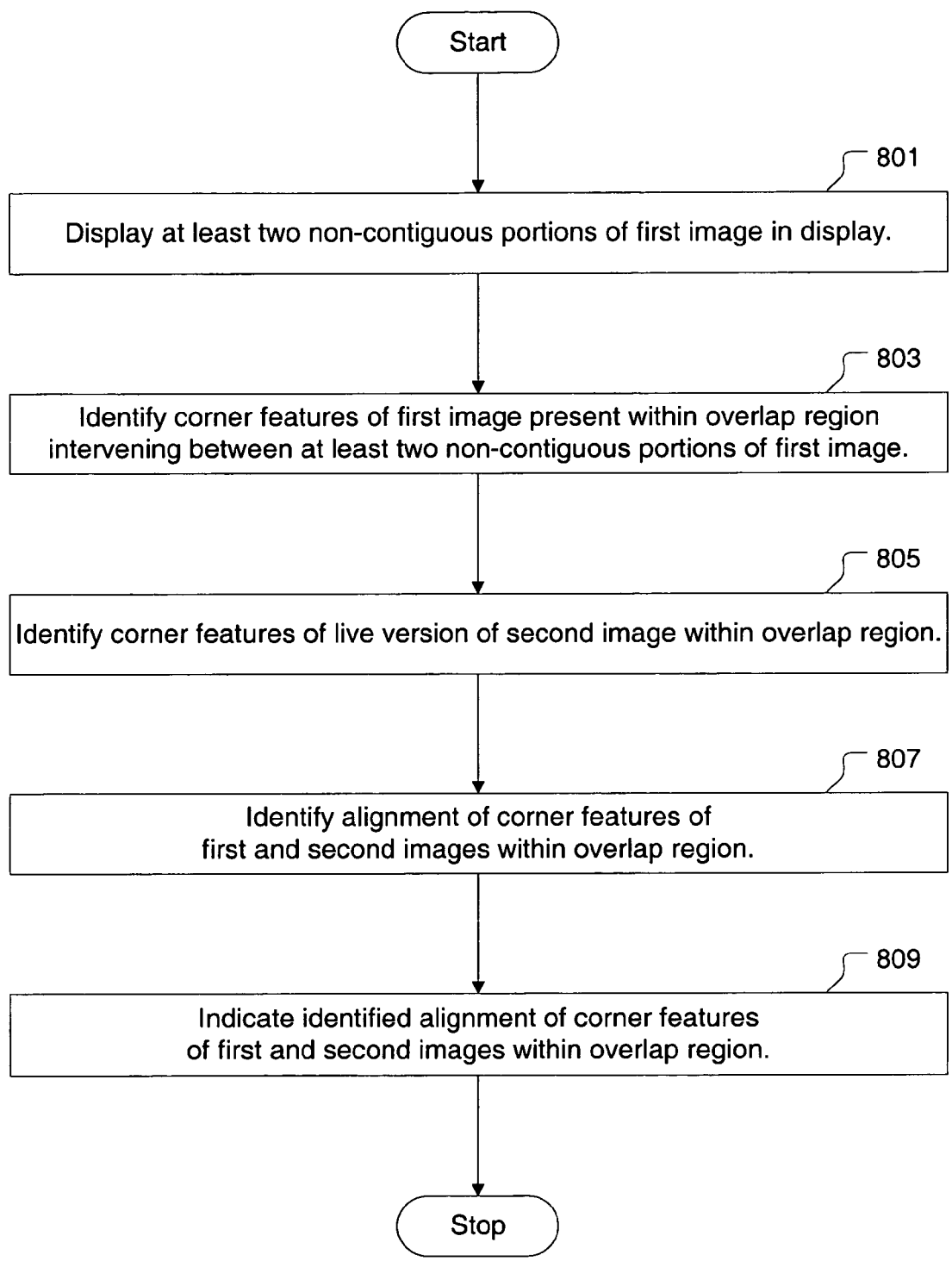
FIG. 8 is an illustration showing a flowchart of a method for aligning digital images to be stitched together, in accordance with one embodiment of the present invention.

FIG. 8 is an illustration showing a flowchart of a method for aligning digital images to be stitched together, in accordance with one embodiment of the present invention. The method includes an operation 801 for displaying at least two non-contiguous portions of a first image in a display of a digital imaging device. The method also includes an operation 803 for identifying corner features of the first image present within an overlap region intervening between the at least two non-contiguous portions of the first image. In an operation 805, corner features of a live version of a second image within the overlap region are identified. The live version of the second image is visible in the display in conjunction with the at least two non-contiguous portions of the first image. It should be appreciated that the second image represents an extension of the first image. In one embodiment, the first image represents a left portion of a broader image, and the second image represents a right portion of the broader image.

The method of FIG. 8 also includes an operation 807 for identifying alignment of corner features of the first and second images within the overlap region. Then, an operation 809 is provided for indicating identified alignment of corner features of the first and second images within the overlap region. In one embodiment, indicating identified alignment of corner features of the first and second images within the overlap region is performed by changing a color of a number of pixels corresponding to identified aligned corner features. In another embodiment, indicating identified alignment of corner features of the first and second images within the overlap region is performed by illuminating a signal light. Additionally, the method can include an operation for indicating an insufficient alignment of the first image and the live version of the second image by illuminating a warning light.

Figure 9:
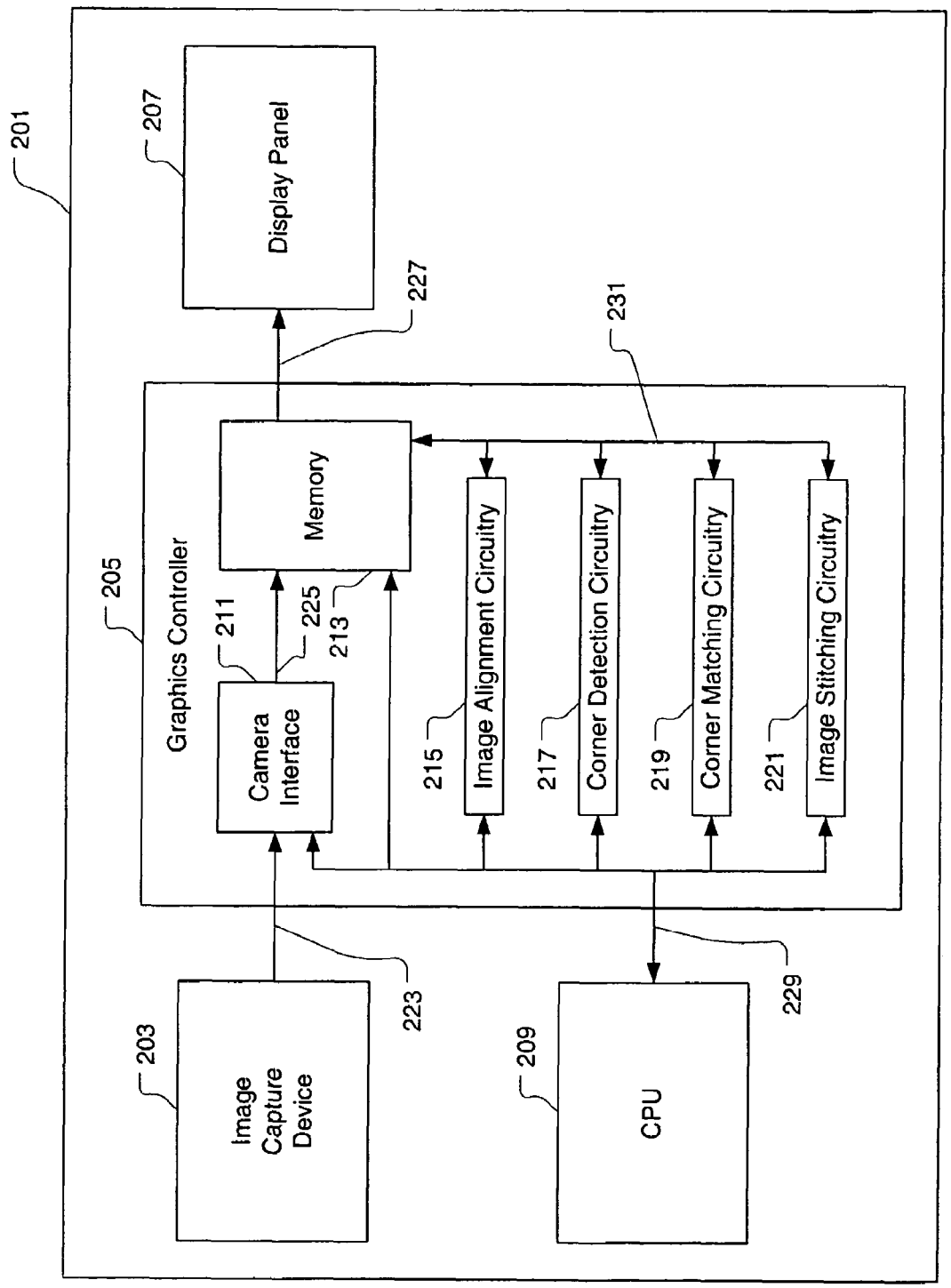
FIG. 9 is an illustration showing an exemplary digital image processing system, in accordance with one embodiment of the present invention.

In one embodiment, the present invention is implemented as hardware in a graphics controller of a digital image processing system. FIG. 9 is an illustration showing an exemplary digital image processing system, in accordance with one embodiment of the present invention. The digital image processing system includes an image capture device 203, a graphics controller 205, a central processing unit (CPU) 209, and a display panel 207. It should be appreciated that the image capture device 203 can be a digital camera, a digital video camera, or any other device capable of capturing images in a digital format. Also, it should be appreciated that the display panel 207 can be any type of display device capable of rendering an image defined by electronic signals, e.g., a liquid crystal display (LCD), a plasma display, a cathode ray tube (CRT) display, etc. In one embodiment, the display panel 207 represents a viewfinder of the image capture device 203. The CPU 209 represents a generalized host device CPU.

The graphics controller 205 includes a camera interface 211, a memory 213, image alignment circuitry 215, corner detection circuitry 217, corner matching circuitry 219, and image stitching circuitry 221. The camera interface 211 is configured to receive digital image data from the camera 203 as indicated by arrow 223. The digital image data is transmitted to the memory 213 for storage, as indicated by arrow 225. The memory 213 is configured to store data for at least two images to be captured by the camera 203. The memory 213 is also configured to store data associated with the image stitching method of the present invention. Image data stored in the memory 213 can be transmitted to the display panel 207 for rendering, as indicated by arrow 227. Additionally, as indicated by arrow 229, the CPU 209 is defined to orchestrate operations of the camera interface 211, the memory 213, the image alignment circuitry 215, the corner detection circuitry 217, the corner matching circuitry 219, and the image stitching circuitry 221. Furthermore, the image alignment circuitry 215, the corner detection circuitry 217, the corner matching circuitry 219, and the image stitching circuitry 221 are each configured to communicate with the memory 213, as indicated by arrows 231, to perform operations on the data stored in the memory 213.

The image alignment circuitry 215 is defined to retain a display of at least two non-contiguous portions of a first image in the display panel 207 to facilitate alignment of a second image. The at least two non-contiguous portions of the first image represent an alignment template. In one embodiment, the alignment template is selectable from a set of alignment templates capable of being defined by the image alignment circuitry 215. The corner detection circuitry 217 is defined to identify corner features of the first image present within an overlap region intervening between the at least two non-contiguous portions of the first image. The corner detection circuitry 217 is further defined to identify corner features of the second image that are also present within the overlap region. The corner matching circuitry 219 is defined to identify alignment of corner features of the first and second images within the overlap region. It should be appreciated that the corner detection circuitry 217 and the corner matching circuitry 219 are defined to avoid processing portions of the first and second images beyond the overlap region. In one embodiment, the digital image processing system can include one or more indicator/warning lights to provide visual feedback regarding an alignment status of corner features of the first and second images within the overlap region. The image stitching circuitry 221 is defined to use the identified alignment of corner features of the first and second images within the overlap region to translate the second image relative to the first image and digitally combine the translated second image with the first image.

The apparatus and method of the present invention can be particularly useful when implemented in portable electronic devices where processing power is at a premium. Some portable electronic devices that can benefit from the present invention include digital cameras, digital video recorders, digital camera or video enabled cell phones, and other handheld devices having digital imaging capability. Furthermore, it should be appreciated that the present invention provides for stitching two images together using the processing capability available on-board a portable digital image device such as a cell phone or camera. In contrast to the present invention, conventional image stitching methods require images to be stitched together to be downloaded to a desktop computer, or the like, having sufficient processing capability to perform an exhaustive corner matching computation to facilitate the stitching operation.

With the above embodiments in mind, it should be understood that the present invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

While this invention has been described in terms of several embodiments, it will be appreciated that those skilled in the art upon reading the preceding specifications and studying the drawings will realize various alterations, additions, permutations and equivalents thereof. It is therefore intended that the present invention includes all such alterations, additions, permutations, and equivalents as fall within the true spirit and scope of the invention.

The invention claimed is:

1. A method for stitching digital images together onboard a digital imaging device, comprising:
   capturing a first image in a digital format;
   displaying at least two non-contiguous portions of the first image in a display of the digital imaging device, wherein the at least two non-contiguous portions of the first image are separated from each other by an intervening live region of the display;
   using the at least two non-contiguous portions of the first image to align a live version of a second image in the display, wherein the second image is an extension of the first image;
   capturing the second image in a digital format; and
   applying a computer implemented corner feature matching algorithm to determine an offset of the second image with respect to the first image required to achieve a substantially accurate alignment of the first and second images, wherein application of the computer implemented corner feature matching algorithm is limited to an overlap region of the first and second images present between the at least two non-contiguous portions of the first image, wherein a corner feature is defined by a limited pixel are within which large contrast changes exist between pixels in both horizontal and vertical directions.

2. A method for stitching digital images together onboard a digital imaging device as recited in claim 1, wherein the first image represents a left portion of a broader image and the second image represents a right portion of the broader image.

3. A method for stitching digital images together onboard a digital imaging device as recited in claim 1, wherein the at least two non-contiguous portions of the first image includes an upper right portion of the first image and a lower right portion of the first image, the overlap region existing between the upper right portion of the first image and the lower right portion of the first image.

4. A method for stitching digital images together onboard a digital imaging device as recited in claim 1, further comprising:
    computationally translating the second image relative to the first image by the determined offset.

5. A method for stitching digital images together onboard a digital imaging device as recited in claim 4, further comprising:
    digitally combining the second image having been translated with the first image to generate a composite image.

6. A method for stitching digital images together onboard a digital imaging device as recited in claim 1, further comprising:
    digitally analyzing an alignment of the first image and the live version of the second image to assist with using the at least two non-contiguous portions of the first image to align the live version of the second image in the display, wherein the digitally analyzing is limited to the overlap region present between the at least two non-contiguous portions of the first image.

7. A method for stitching digital images together onboard a digital imaging device as recited in claim 6, further comprising:
    indicating a sufficient alignment of the first image and the live version of the second image by illuminating a signal light.

8. A method for stitching digital images together onboard a digital imaging device as recited in claim 6, further comprising:
    indicating an insufficient alignment of the first image and the live version of the second image by illuminating a warning light.

9. A method for stitching digital images together onboard a digital imaging device as recited in claim 6, wherein capturing the second image in the digital format is performed automatically upon identifying a sufficient alignment of the first image and the live version of the second image.

10. A method for stitching digital images together onboard a digital imaging device as recited in claim 6, wherein digitally analyzing the alignment of the first image and the live version of the second image includes,
    computationally identifying corner features present in the first image within the overlap region present between the at least two non-contiguous portions of the first image,
    computationally identifying corner features present in the live version of the second image within the overlap region present between the at least two non-contiguous portions of the first image,
    computationally recognizing an alignment of common identified corner features present in the first image and the live version of the second image within the overlap region present between the at least two non-contiguous portions of the first image, and
    indicating alignment of the common identified corner features present in the first image and the live version of the second image within the overlap region present between the at least two non-contiguous portions of the first image,
    wherein each of the corner features is defined by a limited pixel area within which large contrast changes exit between pixels in both horizontal and vertical directions.

11. A method for stitching digital images together onboard a digital imaging device as recited in claim 10, wherein indicating alignment of the common identified corner features present in the first image and the live version of the second image is performed by changing a color of a number of pixels corresponding to the common identified corner features.

12. A method for aligning digital images to be stitched together, comprising:
    displaying at least two non-contiguous portions of a first image in a display of a digital imaging device, wherein the at least two non-contiguous portions of the first image are separated from each other by an intervening live region of the display;
    computationally identifying corner features of the first image present within an overlap region intervening between the at least two non-contiguous portions of the first image;
    computationally identifying corner features of a live version of a second image within the overlap region, wherein the live version of the second image is visible in the display in conjunction with the at least two non-contiguous portions of the first image, the second image representing an extension of the first image;
    computationally identifying alignment of corner features of the first and second images within the overlap region; and
    indicating identified alignment of corner features of the first and second images within the overlap region,
    wherein each of the corner features is define by a limited pixel area within which large contrast changes exist between pixels in both horizontal and vertical directions.

13. A method for aligning digital images to be stitched together as recited in claim 12, wherein indicating identified alignment of corner features of the first and second images within the overlap region is performed by changing a color of a number of pixels corresponding to identified aligned corner features.

14. A method for aligning digital images to be stitched together as recited in claim 12, wherein the first image represents a left portion of a broader image and the second image represents a right portion of the broader image.

15. A method for aligning digital images to be stitched together as recited in claim 12, wherein indicating identified alignment of corner features of the first and second images within the overlap region is performed by illuminating a signal light.

16. A method for aligning digital images to be stitched together as recited in claim 12, further comprising:
indicating an insufficient alignment of the first image and the live version of the second image by illuminating a warning light.

17. A digital imaging device, comprising:
an image capture device configured to capture a first image and a second image in an electronic format, the first image and the second image having an amount of overlap;
a display panel configured to display the first image and the second image to be captured by the image capture device; and
a graphics controller including,
image alignment circuitry defined to retain a display of at least two non-contiguous portions of the first image in the display panel to facilitate alignment of the second image, wherein the at least two non-contiguous portions of the first image are separated from each other by an intervening live region of the display,
corner detection circuitry defined to identify corner features of the first image present within an overlap region intervening between the at least two non-contiguous portions of the first image, the corner detection circuitry further defined to identify corner features of the second image that are present within the overlap region, wherein each of the corner features is defined by a limited pixel area within which large contrast changes exist between pixels in both horizontal and vertical directions,
corner matching circuitry defined to identify alignment of corner features of the first and second images within the overlap region, and
image stitching circuitry defined to use the identified alignment of corner features of the first and second images within the overlap region to translate the second image relative to the first image and digitally combine the translated second image with the first image.

18. A digital imaging device as recited in claim 17, wherein the display panel is a viewfinder for the image capture device.

19. A digital imaging device as recited in claim 17, wherein the first image represents a left portion of a broader image and the second image represents a right portion of the broader image.

20. A digital imaging device as recited in claim 17, wherein the at least two non-contiguous portions of the first image represent an alignment template, the alignment template being selectable from a set of alignment templates capable of being defined by the image alignment circuitry.

21. A digital imaging device as recited in claim 17, wherein the corner detection circuitry and the corner matching circuitry are defined to avoid processing portions of the first and second images beyond the overlap region.

22. A digital imaging device as recited in claim 17, further comprising:
a processor defined to orchestrate operations between the image capture device, the display panel, and the graphics controller.

23. A graphics controller, comprising:
image alignment circuitry defined to display non-contiguous portions of a first image in a display panel during alignment of a second image in the display panel, wherein the non-contiguous portions of the first image are separated from each other by an intervening region of the display panel within which a portion of the second image is to be displayed;
corner detection circuitry defined to identify corner features of the first and second images within the intervening region between the non-contiguous portions of the first image to be displayed in the display panel, wherein each of the corner features is defined by a limited pixel area within which large contrast changes exist between pixels in both horizontal and vertical directions;
corner matching circuitry defined to recognize alignment of identified corner features of the first and second images within the intervening region between the non-contiguous portions of the first image to be displayed in the display panel; and
image stitching circuitry defined to use the recognized alignment of identified corner features of the first and second images to translate the second image relative to the first image and digitally combine the translated second image with the first image.

24. A graphics controller as recited in claim 23, wherein each of the non-contiguous portions of the first image are at least partially present within the second image.

25. A graphics controller as recited in claim 23, wherein the non-contiguous portions of the first image represent an alignment template, the alignment template being selectable from a set of alignment templates capable of being defined by the image alignment circuitry.

26. A graphics controller as recited in claim 23, wherein the corner detection circuitry and the corner matching circuitry are defined to avoid processing portions of the first and second images beyond the intervening region between the non-contiguous portions of the first image to be displayed in the display panel.

27. A graphics controller as recited in claim 23, wherein the first image represents a left portion of a broader image and the second image represents a right portion of the broader image.

28. A graphics controller as recited in claim 27, wherein the non-contiguous its portions of the first image include an upper right portion of the first image and a lower right portion of the first image.

* * * * *